UNITED STATES PATENT OFFICE.

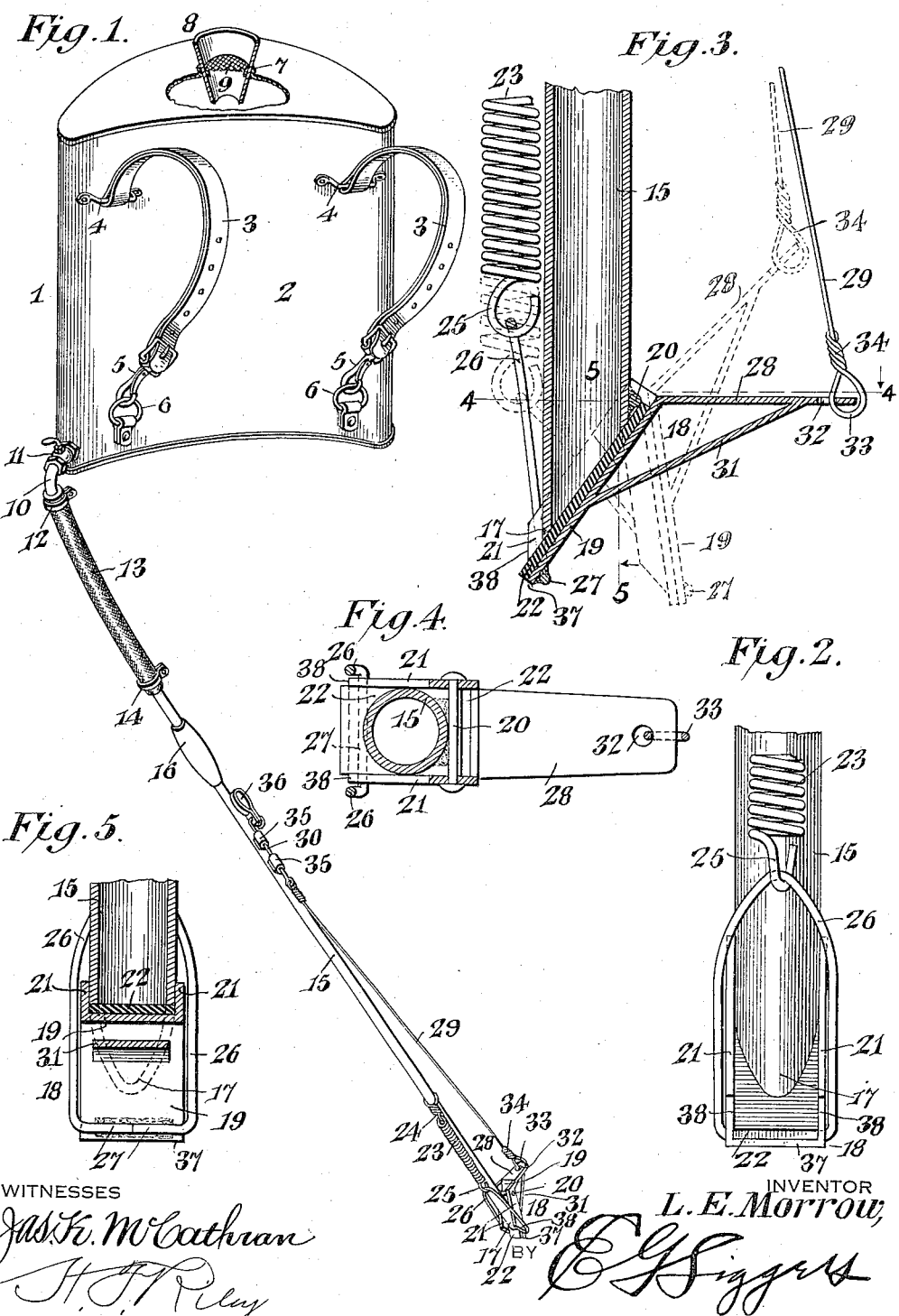

LLOYD EDWIN MORROW, OF SANFORD, FLORIDA.

PLANT-WATERER.

1,176,479.  Specification of Letters Patent.  Patented Mar. 21, 1916.

Application filed November 27, 1914. Serial No. 874,265.

*To all whom it may concern:*

Be it known that I, LLOYD EDWIN MORROW, a citizen of the United States, residing at Sanford, in the county of Orange and State of Florida, have invented a new and useful Plant-Waterer, of which the following is a specification.

The invention relates to improvements in plant waterers.

The object of the present invention is to improve the construction of plant waterers and to provide a simple, practical, and efficient device of inexpensive construction, adapted to be easily carried and rapidly operated without waste of the water and with perfect control of the same, and capable of placing the water just where it is required.

A further object of the invention is to provide a plant waterer of this character, designed particularly for watering various plants after the same have been transplanted from a seed bed to a field or garden, and capable of washing the earth firmly around the roots of the plants without wetting the foilage or washing any of the dirt into the crown of the plant.

With these and other objects in view the invention consists in the construction and novel combination of parts hereinafter fully described, illustrated in the accompanying drawing, and pointed out in the claims hereto appended, it being understood that various changes in the form, proportion, size and minor details of construction, within the scope of the claims, may be resorted to without departing from the spirit or sacrificing any of the advantages of the invention.

In the drawing: Figure 1 is a perspective view of a plant waterer constructed in accordance with this invention, the tank being partly broken away and the removable strainer being sectioned. Fig. 2 is an enlarged front elevation of the discharge end of the device. Fig. 3 is a longitudinal sectional view of the same. Fig. 4 is a horizontal sectional view on the line 4—4 of Fig. 3. Fig. 5 is a transverse sectional view on the line 5—5 of Fig. 3.

Like numerals of reference designate corresponding parts in all the figures of the drawing.

In the accompanying drawing, in which is illustrated the preferred embodiment of the invention, 1 designates a tank or reservoir constructed of sheet metal or other suitable material, and preferably provided at one side with a concave face 2 to conform generally to the configuration of the back of a person, and equipped with straps 3 through which the arms of the operator are placed. The straps 3, which are adjustable, are connected with upper loops 4 of the reservoir and are provided with combined snap hooks and buckles 5 adapted to vary the length of the straps and also detachably engage with lower rings 6 of the tank or reservoir 1. The tank or reservoir is provided at the top with a filling orifice 7, and it is designed to be provided with a removable strainer 8 having a sieve 9 or other straining medium for excluding trash and dirt from the tank or reservoir.

The tank or reservoir has an elbow 10 located at the bottom of the tank at one of the side edges thereof, and preferably provided with a valve 11 for controlling the flow of water. The elbow has secured to it, by a clamp 12 or other suitable means, one end of a flexible tube or hose 13, which is secured at its other end by a clamp 14 to one end of a tubular stem or discharge pipe 15, and the said flexible tube or hose 13 is of sufficient length to afford the operator perfect freedom of movement in handling the tubular stem or discharge pipe 15. The tubular stem or discharge pipe 15, which may be of any desired length, is provided at its upper end with a wooden handle 16, consisting of a sleeve suitably secured to the pipe or stem 15.

The outer or discharge end 17 of the pipe or stem is beveled, the inclined edge extending inwardly or rearwardly and providing a forward or outward taper to the discharge end of the pipe or stem, as clearly illustrated in Fig. 3 of the drawing. The device is equipped at the beveled or tapered discharge end with a valve 18, consisting of an angularly disposed plate 19 pivotally connected to the pipe or stem at the rear side thereof adjacent to the inner or rear end of the beveled edge by a transverse pin 20 or other suitable fastening device, and provided at opposite sides with straight side flanges 21. The valve is equipped with a removable gasket 22, constructed of rubber or other suitable material and held in position by the side flanges, and adapted to fit against the beveled edge of the discharge tube to form a water tight joint or connection when the valve is closed. The valve is firmly maintained in its closed position by means of a coiled spring 23, extending along the lower or outer portion of the tubular pipe or stem and secured at its upper end 24 to the same, and provided at its lower end with an eye or hook 25, which is linked into a bail 26. The bail 26, which has a tapered inner or upper portion, is provided at the lower ends of its sides with inwardly extending portions 27, which are suitably secured to the outer portion of the valve at the exterior of the plate 19.

The valve is provided at the inner end of the plate 19 with an angularly related arm 28, preferably arranged substantially at right angles to the discharge pipe or stem when the valve is in its closed position, and connected at its outer end with a wire 29, which extends from the arm of the valve to a slidable rod or trigger 30. The arm 28 is supported by a brace 31, extending from the central portion of the plate 19 to the outer portion of the arm, and the latter is provided beyond the brace with an opening 32 into which is linked a loop 33 formed by bending the lower or outer portion of the wire 29 on itself, the end 34 of the wire being twisted or wrapped around the body portion of the said wire, but the latter may be connected with the arm of the plate in any other desired manner, as will be readily understood.

The trigger 30 is mounted in spaced longitudinally alined guides 35, and it is provided at its upper end with a finger loop 36 arranged adjacent to the handle 16 so as to be easily operated. When the operator approaches a plant, he places the discharge end of the pipe at the ground surrounding the stem of the plant, and pulls the trigger, which allows a quantity of water to discharge from the tubular pipe or stem. The water is directed against the soil by the tapered end of the discharge pipe or stem, and the angularly disposed valve, which extends across and has its front portion 37 projecting in advance of the front wall of the said pipe or stem, whereby the soil is washed firmly against the roots of the plants without wetting the foliage or washing dirt into the same, which is injurious to tender plants. The side flanges 21 of the valve also extend in advance of the front wall of the said pipe or stem and have beveled front ends 38. By washing the soil firmly around the plants in this manner, the latter are caused to grow quickly. When sufficient water has been supplied to a plant, the operator releases the trigger and the valve is instantly closed by the coiled spring 23. The device is easily carried and is adapted to be rapidly operated, enabling the operator to move quickly from plant to plant and water the same with great accuracy.

What is claimed is:—

1. A plant waterer comprising a discharge pipe provided with a beveled discharge end, an angularly disposed valve extending across said beveled end of the pipe and hinged thereto, means connected to the valve at the hinged terminal for actuating the same, and a spring connected to the other terminal of the valve and to the pipe for restraining the opening of the valve.

2. A plant waterer including a discharge pipe provided with a beveled discharge end, a valve extending across the beveled end of the discharge pipe and pivoted at the back thereof, a bail secured to the front portion of the valve at opposite sides of the same, a coiled spring mounted on the discharge pipe and connected with the bail, and operating mechanisms for opening the valve against the action of the spring.

3. A plant waterer comprising a discharge pipe having a beveled discharge end, a valve hinged to said pipe for closing said discharge end, rigid flanges formed on the sides of said valve extending along the side walls of said pipe transversely thereof and forming a trough to cause the water to be discharged from the free end of said valve, and means for actuating the valve.

4. A plant waterer comprising a discharge pipe having a beveled discharge end, a valve hinged to said pipe for closing said discharge end, flanges formed on said valve extending along the side walls of said pipe and forming a trough to cause the water to be discharged from the free end of said valve, means for actuating the valve, and means connected to the free end of the valve and to the pipe for restraining the opening.

5. A plant waterer including a discharge pipe provided with a beveled discharge end, a valve having an angularly disposed plate extending across the beveled end of the discharge pipe and provided at opposite sides with side flanges which extend along opposite sides of the plate and fit against the outside of the pipe transversely thereof when the valve is closed, a removable elastic gasket fitted against the plate and arranged to bear against the lower beveled end of the discharge pipe, said gasket being retained in place by the side flanges of the valve, means for pivotally mounting the valve on the pipe, and means for opening and closing the valve, said flanges when the valve is open serving to prevent the water from discharging laterally.

In testimony, that I claim the foregoing as my own, I have hereto affixed my signature in the presence of two witnesses.

LLOYD EDWIN MORROW.

Witnesses:
F. E. MITTEER,
J. J. DICKINSON.

Copies of this patent may be obtained for five cents each, by addressing the "Commissioner of Patents, Washington, D. C."